United States Patent [19]

Bonecker et al.

[11] Patent Number: 4,459,499
[45] Date of Patent: Jul. 10, 1984

[54] ALTERNATOR WITH AN INTERFERENCE-REDUCING CAPACITOR

[75] Inventors: Franz Bonecker, Freiberg; Henning Fasterding, Markgröningen, both of Fed. Rep. of Germany

[73] Assignee: Robert Bosch GmbH, Stuttgart, Fed. Rep. of Germany

[21] Appl. No.: 423,466

[22] Filed: Sep. 24, 1982

[30] Foreign Application Priority Data

Feb. 4, 1982 [DE] Fed. Rep. of Germany ....... 3203725

[51] Int. Cl.³ ............................................. H02K 11/00
[52] U.S. Cl. ................................ 310/68 R; 310/68 D; 310/71
[58] Field of Search ............... 310/68 D, 68 R, 72, 310/43, 159, 263, 42, 45, 68 C, 87, DIG. 6, 71; 361/306, 308, 372

[56] References Cited

U.S. PATENT DOCUMENTS

| | | | |
|---|---|---|---|
| 2,956,220 | 10/1960 | Kohring | 361/308 |
| 3,218,492 | 11/1965 | Babitzka | 310/43 |
| 4,137,560 | 1/1979 | Moore | 363/145 |
| 4,288,711 | 9/1981 | Hagenlocher et al. | 310/68 D |
| 4,329,605 | 5/1982 | Angi et al. | 310/68 R |
| 4,342,934 | 8/1982 | van Wijhe et al. | 310/239 |

Primary Examiner—J. D. Miller
Assistant Examiner—D. L. Rebsch
Attorney, Agent, or Firm—Frishauf, Holtz, Goodman & Woodward

[57] ABSTRACT

A three-phase current alternator is particularly suited for automotive vehicles having three-phase current coils and three diode pairs for the alternator load current. The diodes of each pair are connected with one another and with one each of the three-phase current coils by conductive tracks located in, or over, a connection plate. An interference-reducing capacitor which, together with connection tabs, forms a prefabricated unit, is molded into the connection plate, the tabs positioning the capacitor in the production mold.

7 Claims, 7 Drawing Figures

ALTERNATOR WITH AN INTERFERENCE-REDUCING CAPACITOR

The present invention relates to an alternator, especially for automotive vehicles, and particularly to a three-phase alternator having an interference-reducing capacitor mounted within the housing of the alternator and connected through and attached to a terminal board or connection plate.

BACKGROUND

In mass-produced three-phase alternators for automotive vehicles, an interference-reducing capacitor is usually mounted on the outer surface of the alternator. Such a mounting permits the exchange of the interference-reducing capacitor, but it involves additional mounting structure and costs.

THE INVENTION

It is an object of the present invention to provide a cost-effective solution for the mounting of the interference-reducing capacitor, which will simultaneously protect the capacitor from mechanical damage.

Briefly, according to the present invention a connection plate, usually provided, is made of moldable material and the interference-reducing capacitor is molded into the material of the connection plate.

In accordance with a feature of the invention, which is an especially advantageous configuration able to withstand the vibrations which occur during the use of an automotive vehicle, the interference-reducing capacitor is molded together with its connection leads in the material of the connection plate. A unit, built with the interference-reducing capacitor together with its connection hardware, which is soldered to both sides of the capacitor, can be prefabricated and inserted into the connection plate during the production of the connection plate by injection or pressure molding, with the material of the connection plate at least partially surrounding the interference-reducing capacitor unit.

DRAWINGS

Figure 1:
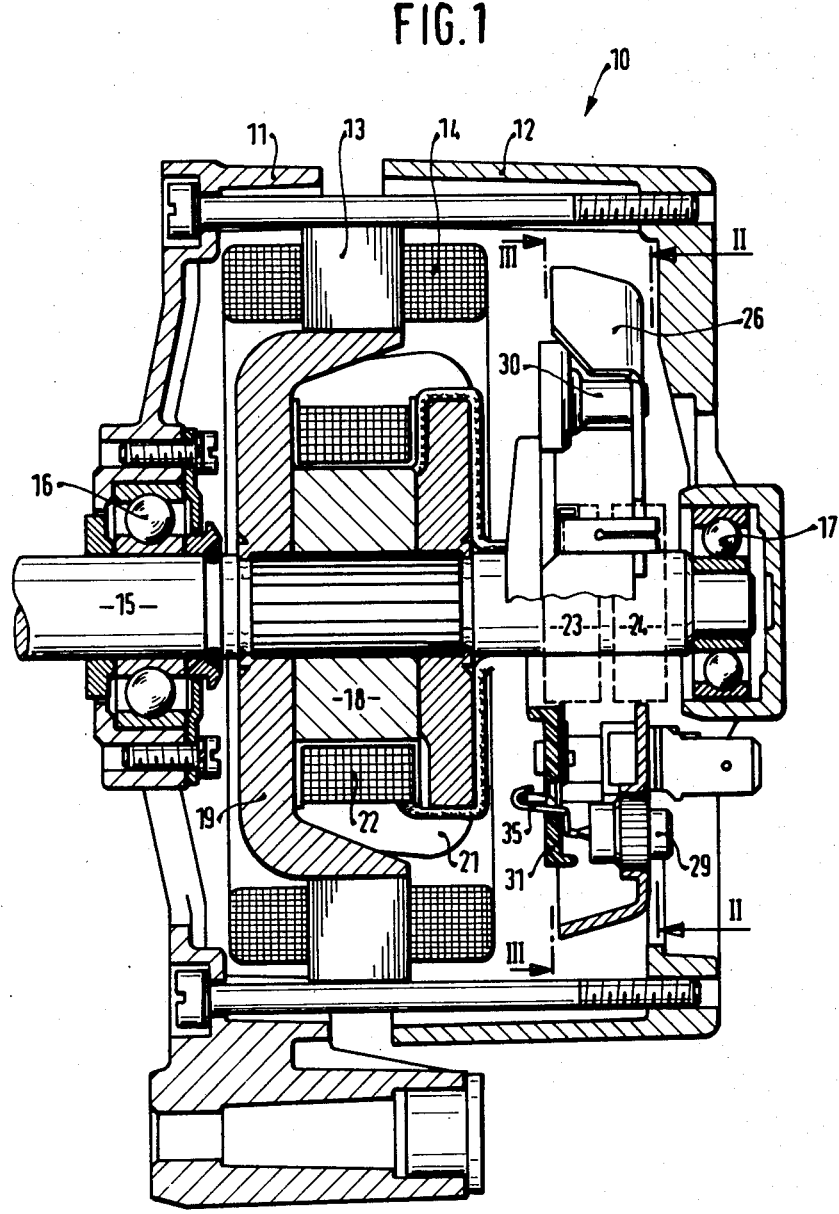
FIG. 1 is an axial longitudinal section of a three-phase alternator. The connection plate, as well as the cooling plates and the load-current coils mounted on the cooling plates, are shown partially in longitudinal section along the line I—I of FIG. 2 (which is an angle section line)
Figure 2:
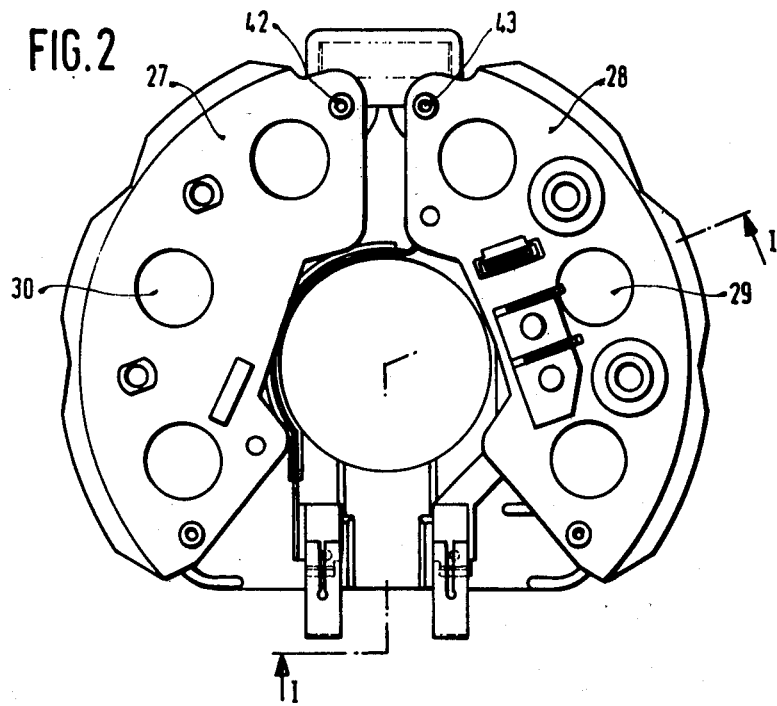
FIG. 2 shows the connection plate in an axial end view in the direction of arrows II—II in FIG. 1, showing both cooler plates.
Figure 3:
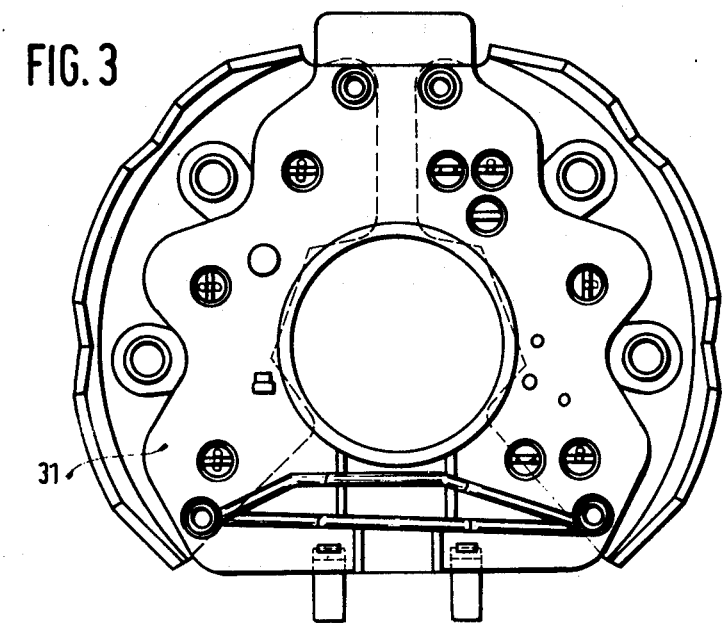
FIG. 3 shows an end view of the connection plate, together with the cooler plates in the direction of arrows III—III of FIG. 1.
Figure 4:
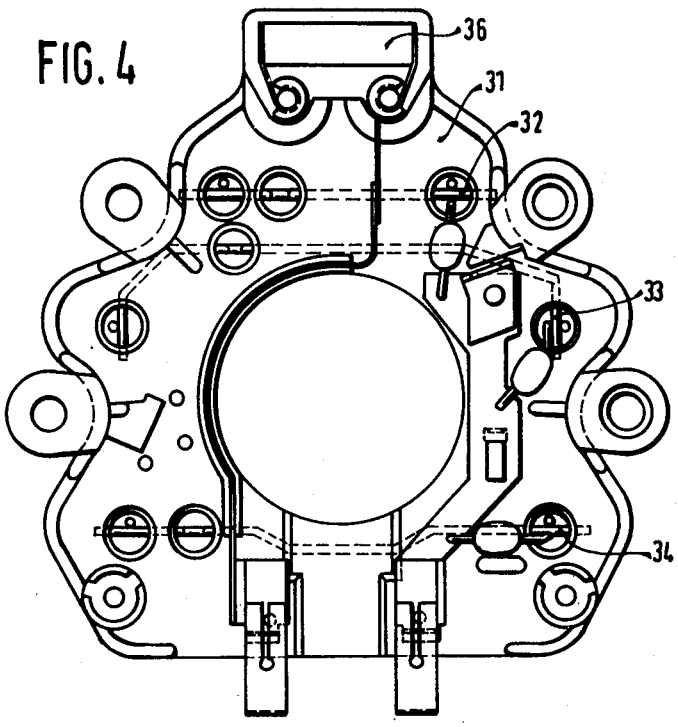
FIG. 4 shows the connection plate as in FIGS. 2 or 3, without the cooling plates.

The three-phase alternator 10 is driven by the engine of an automotive vehicle. The cup-shaped bearing plate 11, which is close to the drive side of the engine and the cup-shaped bearing plate 12 which is remote from the drive, serve as the housing of the alternator 10. The armature lamination stack 13 is clamped between the two bearing plates 11 and 12. The armature lamination stack 13 supports three-phase current coils 14. The alternator shaft 15 is rotatably inserted and journalled by a first bearing 16 in bearing plate 11, and by a second bearing 17 in bearing plate 12. Mounted on the alternator shaft 15 is a claw-pole rotor having a core 18, two interlacing pole rotors 19 and 21, as well as an excitation or field winding 22 which surrounds the core 18. The excitation current is conducted through the excitation coil by two sliprings 23 and 24, shown in FIG. 1 with broken lines. The excitation current is determined by a voltage regulator, not shown in the drawings, to provide, at the alternator output, a voltage substantially independent of the rotation drive speed of the engine and the alternator load. To obtain the DC output voltage, a rectifier 26 is provided. The rectifier comprises two cooling plates 27 and 28, shown in FIG. 2, respectively having three diodes 29 connected to the positive side of the rectifier, and three diodes 30 connected to the negative side of the rectifier, and a connection plate 31, shown in greater detail in FIG. 4, made of a molded, hardening synthetic material. Embedded in the connection plate 31 are three connection leads 32,33 and 34, to which the three-phase current coils can be individually connected. The connection leads 32,33 and 34 each connect to connection wires 35 of a diode pair, consisting of a positively connected diode 29 and a negatively connected diode 30, with one three-phase current coil. An interference-reducing capacitor 36 is provided, as well known.

Figure 5:
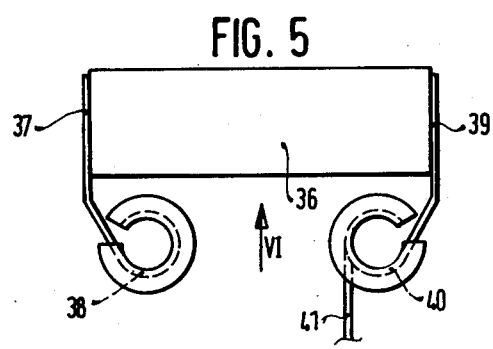
FIG. 5 shows a side view of the interference-reducing capacitor unit.
Figure 7:
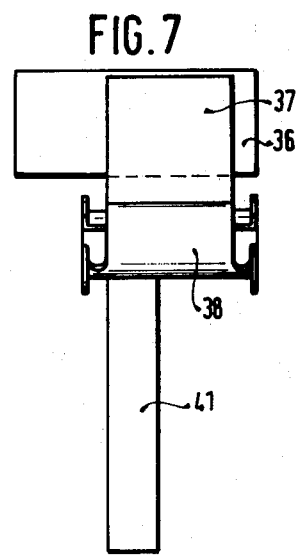
FIG. 7 shows an end view of the interference-reducing capacitor unit looking in the direction from the left-hand to the right-hand side of the unit, as shown in FIG. 5.
Figure 6:
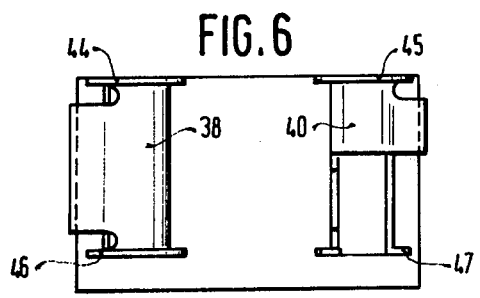
FIG. 6 shows the interference-reducing capacitor unit in a top view looking along arrow VI of FIG. 5.

In accordance with the invention, the capacitor 36 is integrated into the connection plate 31. The extended surface of a strip of sheet metal 37 is soldered onto the interference-reducing capacitor, as shown in FIGS. 5 and 6. At its free end, the strip of metal 37 is rolled into a sleeve 38. Another strip of sheet metal 39 is soldered onto the other side of the interference-reducing capacitor 36, and similarly rolled into a sleeve 40, but made to project tangentially as a narrow metal connection strip 41. Strips 37, 39 form connection tabs. The interference-reducing capacitor 36, together with its connection hardware 37–41, forms a prefabricated component which is inserted into the pressure mold of the connection plate 31, during the production of the 38 and 40 serve to position the capacitor 36. Their sleeve axes extend transversely to the plane of the plate 31. Sleeves 38 and 40 also serve to provide metallic contact of the capacitor with, respectively, the cooling plate 28, which during operation of the alternator is at positive potential, and the plate 27 which is at negative potential, when these plates are connected to the connection plate 31 by hollow rivets 42 and 43, which are riveted through the sleeves. Each of the two sleeves 38 and 40 have formed at one of their front surfaces a round, flange-type extension 44,45, for contacting with the rivets 42,43, respectively. On the other front surface of the sleeves are flanges 46 and 47, respectively. Flanges 46 and 47 are enclosed by the insulating plastic material of the connection plate 31 and provide for the firm attachment of the interference-reducing capacitor unit to the connection plate.

Various changes and modifications may be made in, and differing constructions used for the embodiment outlined above, within the scope of the inventive concept. The connection plate 31 may be made of an insulating, molded, hardening synthetic material such as polyamide or polypropylene.

We claim:

1. An alternator-rectifier combination, particularly for automotive vehicles, comprising:

an alternator housing, having bearing plates (11, 12);

a rotor (15) providing a rotating field;

an armature lamination stack (13) mounted within the alternator housing (11, 12) and having at least three three-phase current coils (14);

a rectifier assembly, having two cooling plates (27, 28);

two pairs of three rectifier diodes (29, 30) connected to rectify the alternator load current, mounted on respective cooling plates and connected, respectively, to the positive and negative sides of the rectifier assembly;

an interference reducing capacitor (36); and a connection plate (31) having conductive connection leads or tracks (32, 33, 34) and a positive and negative terminal for the alternator load current, mounted co-axially with the claw-pole rotor on the rotor shaft (15) and attached to the two cooling plates (27, 28), the said rectifier diodes (29, 30) being connected by said conductive leads or tracks to the three-phase armature coils (14) and the positive and negative terminals, respectively;

wherein, in accordance with the invention, the connection plate (31) is made of hardened, molded material;

two connection tabs (37, 39) are provided, soldered onto each respective side of the interference reducing capacitor (31) and forming therewith a prefabricated unit;

and wherein the interference-reducing capacitor (36) together with the connection tabs (27, 39) is, at least in part, molded into the connection plate and being at least partially enclosed by the mold material of the connection plate, the interference-reducing capacitor and the connection tabs forming said prefabricated unit having been inserted, at the time of production of the connection plate, into an injection or pressure mold of the connection plate to at least partially embed the interference reducing capacitor in the mold material of the connection plate upon completion of manufacture of the connection plate (31); and the connection tabs comprising sheet-metal strips (37, 39) having a flat surface bonded to the sides of the capacitor and being formed at a region remote from the capacitor with sleeves (38, 40) having sleeve axes extending transversely to the major plane of the connection plate, to receive electrical connection rivets, each extending through the sleeves and being secured to a respective one of the cooling plates (27, 28).

2. Combination according to claim 1, wherein the sleeves (38, 40) each are formed with a flange (44, 45, 46, 47) on at least one of its ends, said flanges being embedded in the molding material upon fabrication on the connection plate and aiding to locate the interference reducing capacitor (36) in the molding material during fabrication.

3. Combination according to claim 1, wherein the sleeves (38,40), together with their metal strips (37,39), form a single connected component.

4. Combination according to clalim 3, wherein the sleeves (38,40) and their respective metal strips (37,39) are formed from a single sheet metal blank.

5. Combination according to claim 1, wherein both cooling plates (27, 28) are mounted in a plane perpendicular to the axis of rotation of the rotor.

6. Alternator-rectifier combination according to claim 1, wherein the connection plate (31) comprises at least one of: molded, hardened synthetic material comprising at least one of the materials of the group consisting of: polyamide; polypropylene.

7. Alternator-rectifier combination according to claim 2, wherein the connection plate (31) comprises at least one of: molded, hardened synthetic material comprising at least one of the materials of the group consisting of: polyamide; polypropylene.

* * * * *